US010823297B2

(12) United States Patent
Artru

(10) Patent No.: US 10,823,297 B2
(45) Date of Patent: Nov. 3, 2020

(54) VALVE FOR URANIUM HEXAFLUORIDE STORAGE TANK

(71) Applicant: DAHER VALVES, Saint Vallier (FR)

(72) Inventor: Patrick Artru, Peaugres (FR)

(73) Assignee: DAHER VALVES, Saint Vallier (FR)

(*) Notice: Subject to any disclaimer, the term of this patent is extended or adjusted under 35 U.S.C. 154(b) by 0 days.

(21) Appl. No.: 16/060,261

(22) PCT Filed: Dec. 7, 2016

(86) PCT No.: PCT/FR2016/053258
§ 371 (c)(1),
(2) Date: Jun. 7, 2018

(87) PCT Pub. No.: WO2017/098152
PCT Pub. Date: Jun. 15, 2017

(65) Prior Publication Data
US 2018/0363788 A1 Dec. 20, 2018

(30) Foreign Application Priority Data
Dec. 8, 2015 (FR) ...................... 15 61993

(51) Int. Cl.
*F16K 5/06* (2006.01)
*F16K 5/20* (2006.01)

(52) U.S. Cl.
CPC ............ *F16K 5/061* (2013.01); *F16K 5/0673* (2013.01); *F16K 5/201* (2013.01)

(58) Field of Classification Search
CPC .......... F16K 5/061; F16K 5/06; F16K 5/0647; F16K 5/0673; F16K 5/0663; F16K 5/08;

(Continued)

(56) References Cited

U.S. PATENT DOCUMENTS 2,877,979 A * 3/1959 Snyder .................... B60T 17/04
251/174
3,164,362 A * 1/1965 Lavigueur ............. F16K 5/0636
251/174

(Continued)

FOREIGN PATENT DOCUMENTS

CN 2078401 U 6/1991
CN 201043616 Y 4/2008

(Continued)

OTHER PUBLICATIONS

Translation of DE3428913 "Hirschberg" provided by the EPO (Year: 1985).*

(Continued)

*Primary Examiner* — David Colon-Morales
(74) *Attorney, Agent, or Firm* — Cantor Colburn LLP

(57) ABSTRACT

The valve (1) comprises a body (2) delimiting a conduit (4) and having a connection portion (6) where one end of the conduit (4) opens, the connection portion (6) being intended to be connected to the storage tank (100). In addition, said valve (1) comprises a clamping member (22) movably mounted on the connection portion (6) in order to keep the connection portion (6) attached to the storage tank (100), sealing member (10) able to rotate in the conduit (4) between a closed position in which the sealing member (10) seals the conduit (4) and an open position in which the sealing member (10) opens a passage through the conduit (4), two seats (24) interposed between the sealing member (10) and the valve body (2), and elastic return means configured to keep the seats (24) and the sealing member (10) pressed together. The conduit (4) has an angled portion (42) arranged between the connection portion (6) and the sealing member (10).

26 Claims, 2 Drawing Sheets

(58) Field of Classification Search
CPC .......... F16K 5/20; F16K 5/201; F16K 5/0605; F16K 27/067; F16K 31/045; F16K 31/048; F16K 31/535; F16K 31/055; F16K 31/60; F16K 31/602; F16K 35/06; F16K 37/0041; F16K 37/005; F16K 41/026; F16K 41/046; F16K 41/066; F16L 19/005; F16L 19/0206
USPC .................................................. 251/174, 144
See application file for complete search history.

(56) References Cited

U.S. PATENT DOCUMENTS

| | | | | |
|---|---|---|---|---|
| 3,184,212 A * | 5/1965 | Billeter | ........ | B60T 17/043 251/105 |
| 3,288,498 A * | 11/1966 | Billeter | ........ | B60T 17/043 285/334.1 |
| 3,463,451 A * | 8/1969 | Treadwell | ........ | F16K 5/0642 251/315.14 |
| 3,591,137 A * | 7/1971 | Billeter | ........ | B60T 17/043 251/205 |
| 3,780,986 A * | 12/1973 | Fujiwara | ........ | F16K 5/0678 251/315.14 |
| 4,089,345 A * | 5/1978 | Eberhardt | ........ | F16K 5/0605 137/315.19 |
| 4,099,543 A * | 7/1978 | Mong | ........ | F16K 5/0605 137/625.22 |
| 4,176,689 A * | 12/1979 | Wrasman | ........ | F16K 5/061 137/797 |
| 4,273,309 A * | 6/1981 | Morrison | ........ | F16K 5/0673 251/174 |
| 4,421,298 A * | 12/1983 | Kujawski | ........ | F16K 1/10 251/186 |
| 4,423,749 A * | 1/1984 | Schmitt | ........ | F16K 5/0689 137/315.2 |
| 4,434,811 A * | 3/1984 | Murdoch | ........ | E21B 17/08 137/515 |
| 4,456,219 A * | 6/1984 | Scott | ........ | F16K 31/602 16/438 |
| 4,475,748 A * | 10/1984 | Ekman | ........ | F16L 19/0206 285/12 |
| 4,477,055 A * | 10/1984 | Partridge | ........ | F16K 5/0673 137/328 |
| 4,483,511 A * | 11/1984 | Kushida | ........ | F16K 5/201 251/172 |
| 4,558,874 A * | 12/1985 | Williams | ........ | F16K 41/046 251/214 |
| 4,602,762 A * | 7/1986 | Koch | ........ | F16K 5/0673 251/172 |
| 4,747,427 A * | 5/1988 | Smith | ........ | F16K 5/0647 137/270 |
| 4,899,781 A * | 2/1990 | Monroe | ........ | F16K 35/10 137/382 |
| 5,090,447 A * | 2/1992 | Lewis | ........ | F16K 5/0657 137/559 |
| 5,099,867 A * | 3/1992 | Emery | ........ | F16K 31/045 137/1 |
| 5,338,003 A * | 8/1994 | Beson | ........ | F16K 3/205 251/172 |
| 5,560,392 A * | 10/1996 | Spang | ........ | F16K 5/0605 137/552 |
| 5,562,116 A * | 10/1996 | Henwood | ........ | F16K 1/22 137/15.22 |
| 6,138,715 A * | 10/2000 | LaLone | ........ | F16K 5/0642 137/797 |
| 6,488,261 B1 * | 12/2002 | Lee | ........ | F16K 5/061 251/174 |
| 6,499,720 B1 * | 12/2002 | Lee | ........ | F16K 5/0678 251/174 |
| 7,032,880 B2 * | 4/2006 | Scaramucci | ........ | F16K 5/0673 251/172 |
| 7,455,372 B2 * | 11/2008 | Wang | ........ | B60T 17/043 251/314 |
| 7,556,239 B2 * | 7/2009 | Beebe | ........ | F16K 5/0642 251/248 |
| 7,635,113 B2 * | 12/2009 | Bearer | ........ | F16K 5/0678 251/174 |
| 7,690,626 B2 * | 4/2010 | Stunkard | ........ | F16K 5/0642 251/174 |
| 7,712,639 B2 * | 5/2010 | Schutz | ........ | B67D 3/04 222/548 |
| 9,086,176 B2 * | 7/2015 | Lai | ........ | F16L 15/04 |
| 9,267,606 B2 * | 2/2016 | Haland | ........ | F16K 5/0678 |
| 9,494,251 B2 * | 11/2016 | Qian | ........ | F16K 5/0668 |
| 9,726,433 B2 * | 8/2017 | Voschezang | ........ | F28D 5/00 |
| 2002/0109116 A1 * | 8/2002 | Stolzman | ........ | F16K 5/0642 251/144 |
| 2005/0067835 A1 * | 3/2005 | Davidson | ........ | F16L 19/0206 285/276 |
| 2008/0012326 A1 * | 1/2008 | Braathen | ........ | F16L 37/088 285/354 |
| 2009/0165866 A1 * | 7/2009 | Fima | ........ | F16K 5/0605 137/15.17 |
| 2010/0078080 A1 * | 4/2010 | Vehmeier | ........ | F16K 5/0605 137/455 |
| 2010/0243938 A1 * | 9/2010 | Sumiya | ........ | F16K 5/0689 251/315.1 |
| 2011/0017932 A1 * | 1/2011 | Domingues Matos | ........ | B29C 45/0017 251/315.16 |
| 2014/0001381 A1 * | 1/2014 | Dougherty | ........ | G21F 5/08 250/507.1 |
| 2015/0308593 A1 * | 10/2015 | Brouwer | ........ | F16L 19/048 137/315.11 |

FOREIGN PATENT DOCUMENTS

| | | | |
|---|---|---|---|
| CN | 204664472 U | 9/2015 | |
| DE | 3428913 A1 * | 10/1985 | ............ G01K 1/14 |
| FR | 1345829 A | 12/1963 | |
| GB | 2020394 A | 11/1979 | |
| GB | 2167837 A * | 6/1986 | ......... F16K 5/0605 |
| WO | WO-2015026059 A1 * | 2/2015 | ............ F16K 31/53 |

OTHER PUBLICATIONS

Translation of WO2015026059 "Kwon" provided by the EPO (Year: 2015).*
English Machine Translation to Abstract CN201043616.
English Machine Translation to Abstract CN204664472.
English Machine Translation to Abstract CN2078401.
Written Opinion for Application No. PCT/FR2016/053258.
International Search Report for Application No. PCT/FR2016/053258.

* cited by examiner

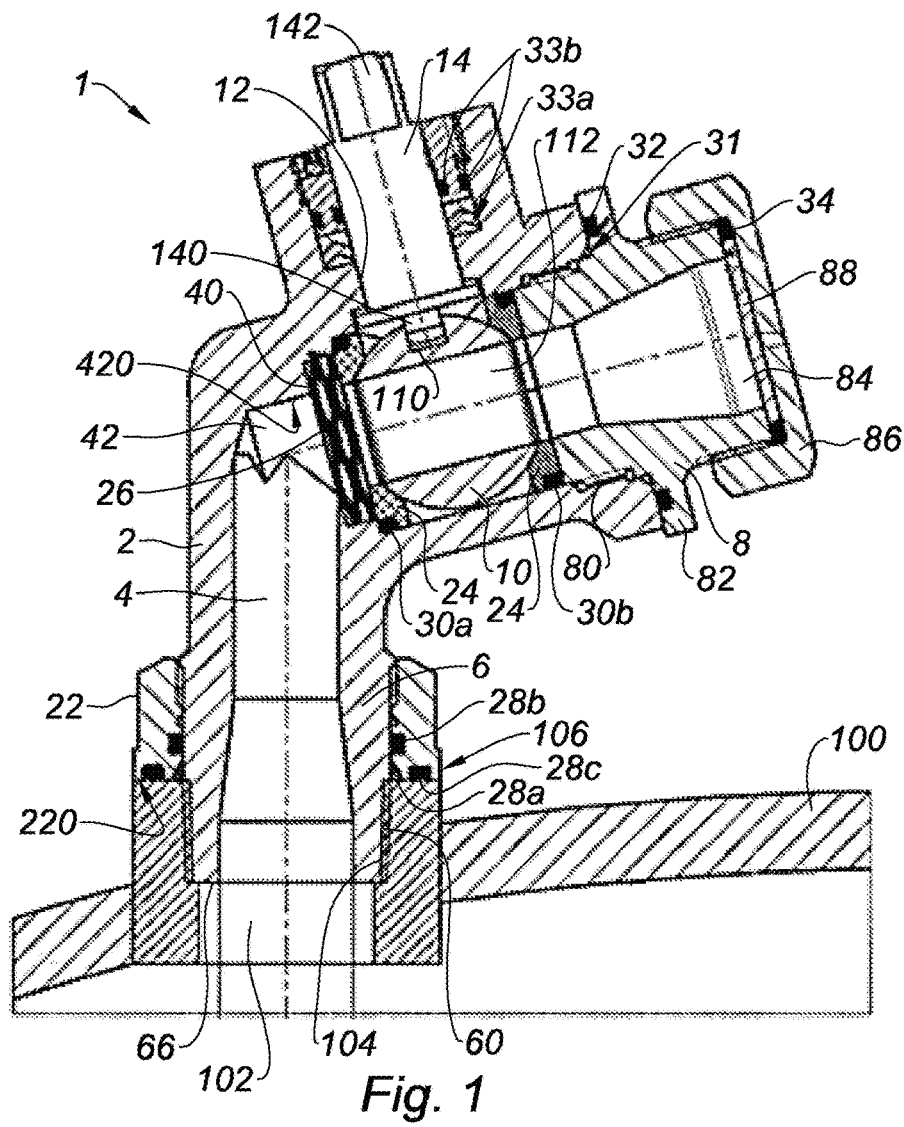
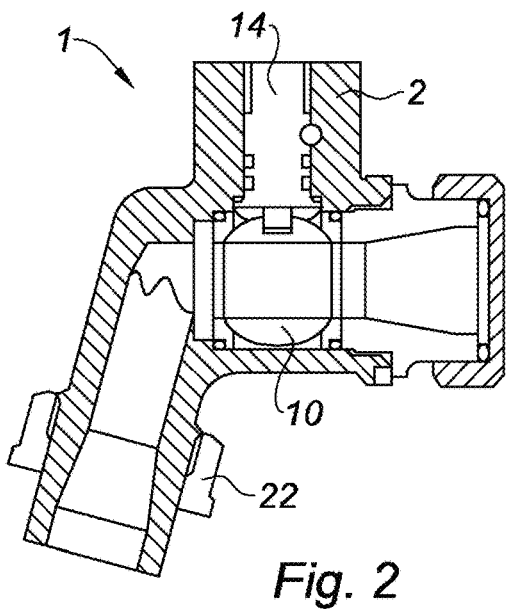
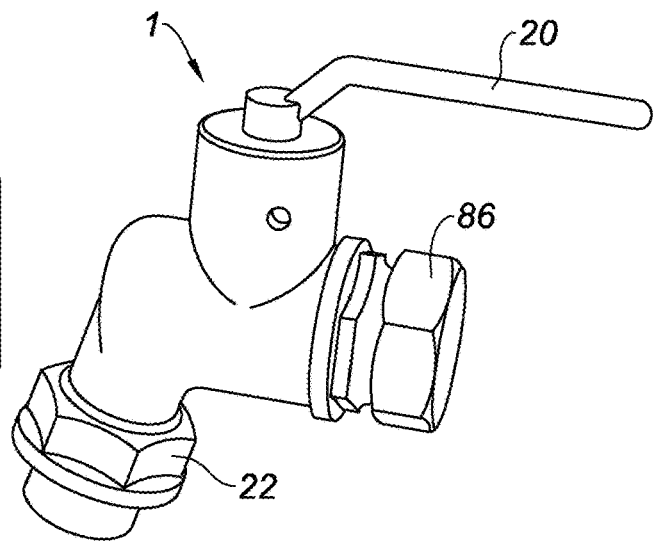
Fig. 1
Fig. 2
Fig. 3

VALVE FOR URANIUM HEXAFLUORIDE STORAGE TANK

CROSS REFERENCE TO RELATED APPLICATIONS

This application is a National Stage of PCT Application No. PCT/FR2016/053258 filed on Dec. 7, 2016, which claims priority to French Patent Application No. 15/61993 filed on Dec. 8, 2015, the contents each of which are incorporated herein by reference thereto.

TECHNICAL FIELD

The present invention concerns a valve for a uranium hexafluoride storage tank ($UF_6$).

BACKGROUND

Before being used as fuel in the field of the nuclear industry, the uranium hexafluoride is conventionally stored in tanks having an opening closed by a valve.

In order to avoid any risk of leakage of uranium hexafluoride out of the tank, these valves for uranium hexafluoride storage tank shall provide a quality sealing.

The existing valves for uranium hexafluoride storage tank are traditionally of the needle valve type, that is to say conventionally comprising a needle screw movable in translation in the body of the valve, between a closing position in which the end of the needle screw bears against a seat formed in the valve body, and an opening position in which the end of the needle screw is at a distance from the seat and puts the portion of the valve connected to the storage cylinder in communication with an outlet duct substantially perpendicular to the body of the valve.

Furthermore, the portion of the valve connected to the uranium hexafluoride storage cylinder conventionally undergoes a tinning to prevent corrosion and thereby guarantee a certain sealing between the storage cylinder and the valve.

These existing valves provide a quality sealing, but have however several risks of internal and external leakage, in case of impact.

Indeed, inside the valve, the sealing is ensured by a metal-rigid metal linear contact between an end of the needle screw and the seat formed in the body of the valve.

Therefore, this requires closing the valve by exerting a minimum clamping torque on the needle screw. If the clamping is not sufficient, there is a risk of loosening and leakage to the outlet duct.

In addition, as the surfaces in contact with the needle screw and the seat are rigid and metallic, slight deformations of these contact surfaces may occur during an impact. These deformations are likely to generate leakage paths.

Moreover, uranium hexafluoride may crystallize inside the storage cylinder and the portion of the valve connected to the storage cylinder. However, the uranium hexafluoride crystals have a high hardness, so that in case of impact, these uranium hexafluoride crystals might degrade the seat or the support surface against which they are projected. Therefore, this may also generate inner leakage paths at the needle screw—seat interface.

Finally, the tinning is also exposed to a risk of deterioration. Where appropriate, this may also generate leakage paths between the storage tank and the valve.

BRIEF SUMMARY

Also, the present invention aims to overcome all or part of these drawbacks by proposing a valve for uranium hexafluoride storage tank, providing an improved sealing, including in case of impacts or vibrations.

To this end, the object of the present invention is a valve for a uranium hexafluoride storage tank, comprising a valve body, the valve body delimiting a duct and having a connector portion where an end of the duct opens, the connector portion being intended to be connected to the storage tank, characterized in that the valve comprises a clamping member movably mounted on the connector portion between a loosening position in which the clamping member is intended to allow a disengagement of the portion of the connector from the storage tank and a clamping position in which the clamping member is intended to hold the connector portion fastened to the storage tank, an obturation member movable in rotation in the duct between a closing position in which the obturation member obturates the duct and an opening position in which the obturation member releases a passage through the duct, two seats interposed between the obturation member and the valve body, and an elastic biasing element configured to hold the seats and the obturation member in bearing contact, and in that the duct has a bent portion, the bent portion being arranged between the connector portion and the obturation member.

Thus, the valve according to the invention offers an improved sealing, including in case of impact.

Indeed, the clamping member avoids accidental loosening of the valve relative to the storage tank.

The seats are distinct from the valve body, which allows holding it in constant bearing against the obturation member, including in case of impact.

Also, the bent portion prevents, in case of impact, the uranium hexafluoride crystals from being projected against the seats or the obturation member. Instead, these crystals are projected against the bent wall of the duct. This avoids degrading the seats or the obturation member and thus altering the sealing provided by the valve according to the invention.

The fact of having an obturation member bearing against two seats has the advantage of making a double sealing at the obturation member and thus improving the sealing provided by the valve.

According to a preferred embodiment, the seats comprise a flexible material.

Thus, the seats hold a sealed contact with the obturation member even in case of impact and slight deformations.

According to a preferred embodiment, the valve comprises a double sealing arrangement.

This feature has the advantage of improving the sealing.

The double sealing arrangement ensures axial and/or radial double sealing relative to the duct.

The double sealing arrangement may comprise at least one seal configured to ensure both an axial sealing and a radial sealing. The two axial and radial seals may therefore comprise a common seal. Thus, the sealing of the valve is substantially improved, with a reduced cost and space.

According to a preferred embodiment, the double sealing arrangement comprises at least a first sealing barrier made of a first material, and a second sealing barrier made of a second material distinct from the first material.

This improves the efficiency of the sealing, in particular in the long term.

According to a preferred embodiment, the valve comprises a control member intended to be actuated by a user in order to control the opening or the closing of the valve, and a reducer linking the control member and the obturation member.

These features allow a better monitoring of the torque to open or close the valve, and therefore improve the accuracy of the displacement of the obturation member between the opening and closing positions. These features also allow minimizing a displacement of the obturation member in case of accidental displacement of the control member. The sealing is thus improved.

According to a preferred embodiment, the valve comprises a control member intended to be actuated by a user in order to control the opening or the closing of the valve, the control member being integrally contained in the valve body or, where appropriate, the reducer.

In other words, the control member does not protrude out of the valve, which limits the risks of accidental displacement of this control member. This therefore contributes to improve the sealing, including in case of impact.

According to a preferred embodiment, the valve comprises a temperature sensor for measuring the temperature of the duct.

This feature allows monitoring the temperature of the uranium hexafluoride and thus preventing it from crystallizing, in particular during a decanting.

BRIEF DESCRIPTION OF THE DRAWINGS

Other features and advantages of the present invention will clearly emerge from the following detailed description of an embodiment, given by way of non-limiting example, with reference to the appended drawings in which:

FIG. 1 is a sectional view of a valve according to an embodiment of the invention;

FIG. 2 is a sectional view of a valve according to an embodiment of the invention;

FIG. 3 is a perspective view of a valve according to an embodiment of the invention.

DETAILED DESCRIPTION

Figure 4:
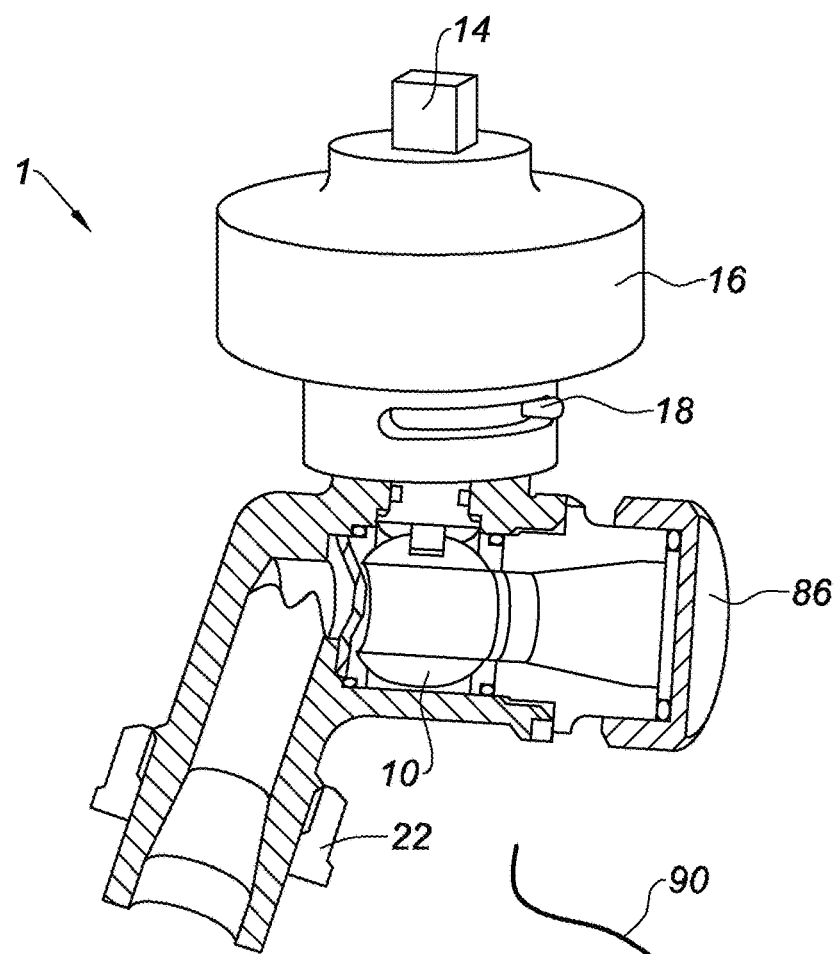
FIG. 4 is a partial sectional view of a valve according to an embodiment of the invention.

FIG. 1 shows a valve 1 for a uranium hexafluoride storage cylinder or tank 100.

The valve 1 comprises a valve body 2 which delimits an inner duct 4, opening, on the one hand, at a connector portion 6 intended to be connected to the storage tank 100 and, on the other hand, at an outlet portion 8 through which the uranium hexafluoride is intended to exit when the valve 1 is used. The valve 1 comprises an obturation member 10 arranged across the duct 4, this obturation member 10 being movable only in rotation in the duct 4, in particular about an axis substantially orthogonal to the duct portion 4 housing the obturation member 10, between an opening position (FIG. 1) in which the obturation member 10 releases a passage for the circulation of uranium hexafluoride from the connector portion 6 to the outlet portion 8, and a closing position (not shown) in which the obturation member obturates the duct 4.

The connector portion 6 is for example intended to be inserted into an opening 102 of the tank 100. Particularly, the connector portion 6 may comprise a thread 60, here outer thread, intended to cooperate with a complementary thread 104 formed inside the opening 102.

The outlet portion 8 may be a distinct portion of the valve body 2, in order to allow the mounting of the obturation member 10 in the valve body 2. The outlet portion 8 is preferably fastened to the valve body 2 via a thread 80 cooperating with a complementary thread of the valve body 2. A clamping stop 82 may be provided to stop the displacement of the outlet portion 8 relative to the valve body 2.

The outlet portion 8 delimits a portion of the duct 4, and has an outlet orifice 84 advantageously obturated by a cap 86.

The valve body 2 also delimits a housing 12, this housing 12 opening inside of the duct 4, and more precisely opening inside of duct portion 4 housing the obturation member 10. The housing 12 here extends substantially orthogonally to the duct portion 4 housing the obturation member 10.

The valve 1 comprises a control member 14, for example a control rod, which is housed inside the housing 12 and which is movable, in particular in rotation, inside the housing 12.

The control member 14 comprises a drive unit configured to cause a rotation of the obturation member 10 to during a displacement of the control member 14.

This driving may be direct, as illustrated on FIG. 1, where the drive unit comprises a tenon 140, here attached to the control member 14, fitted into a mortise 110 here arranged on the obturation member 10. According to the example of FIG. 1, the control member 14 and the obturation member 10 are secured in rotation.

The driving may be indirect, as illustrated in FIG. 4, where the drive unit comprises a reducer 16, for example a planetary gear, linking the control member 14 to the obturation member 10, by reducing the rotational speed ratio between the control member 14 and the obturation member 10, such that a rotation by one turn of the control member 14 causes a rotation of a predetermined turn fraction of the obturation member 10. For example, a quarter turn of the obturation member 10 may correspond to ten turns of the control member 14.

Moreover, as illustrated in FIG. 4, the valve 1 may advantageously comprise a position indicator configured to indicate the position of the obturation member 10. These position indicator is visible from the outside for an operator such that this operator can visually check that the obturation member 10 is in the closing position and therefore that the valve 1 is closed. This provides an additional guarantee to ensure the sealing of the valve 1. The position indicator can be advantageously secured in rotation with the obturation member 10, such that a turn fraction of the obturation member 10 corresponds to the same turn fraction of the position indicator.

The position indicator may comprise a finger 18 movable concomitantly with the obturation member 10, or a mark, for example a groove 142 arranged at an apparent end of the control member 14.

It will be noted that the control member 14 is preferably fully contained in the valve body 2, as shown in FIG. 2 or, where appropriate, the reducer 16. Thus, the control member 14 does not protrude out of the valve body 2, which prevents this control member 14 from hooking or abutting against an outer element at the risk of causing an accidental displacement thereof and consequently of the obturation member 10.

Advantageously, the control member 14 is shaped to be actuated via a tool or key 20, shown in FIG. 3, which also limits a risk of inadvertent displacement of the control member 14. Particularly, an end of the control member 14 may have a shape complementary to that of the tool or key 20.

As illustrated in FIG. 1, the valve 1 comprises a clamping member or fastener 22, such as for example a locknut, intended to secure the fastening of the valve 1, more precisely of the connector portion 6, on the tank 100.

Particularly, the clamping member 22 comprises a clamping surface 220 intended to bear against a peripheral surface 106 of the opening 102 of the tank 100.

The clamping member 22 extends about the connector portion 6. The clamping member 22 is movably mounted relative to the connector portion 6, between a loosening position (FIG. 2) in which the clamping member 22 is intended to allow a disengagement of the portion 6 of the connector relative to the tank 100 and a clamping position (FIG. 1) in which the clamping member 22 is intended to hold the connector portion 6 fastened to the tank 100.

In the clamping position, the clamping member 22 prevents an accidental rotation of the valve 1, in particular the connector portion 6, relative to the tank 100.

In the clamping position, the clamping member 22 is closer to an end 66 of the connector portion 6 than in the loosening position.

In the clamping position, the clamping surface 220 bears against the tank 100.

The clamping member 22 is here movable in rotation and translation relative to the connector portion 6, such that a rotation of the clamping member 22 about the connector portion 6 causes a displacement of the clamping member along said connector portion 6. This allows pressing the clamping surface 220 against the tank in order to guarantee the sealing on the one hand, and to secure the fastening of the connection portion 6 on the tank 100 on the other hand, by preventing an accidental unscrewing of the connector portion 6.

In fact, the connector portion 6 here comprises a second outer thread intended to cooperate with an inner thread of the clamping member 22, such that the clamping member 22 and the connector portion 6 are bonded by a helical-type link allowing a displacement of the clamping member 22 along the connector portion 6 and a clamping against the tank 100.

The valve 1 comprises two seats 24 which are interposed between the obturation member 10 and the valve body 2. The seats 24 are therefore distinct from the valve body 2.

According to the preferred embodiment of FIG. 1, the seats 24 allow making a double sealing.

Preferably, the seats 24 are made of an elastically deformable flexible material. By way of example, the seats 24 are made of polytetrafluoroethylene (PTFE).

The seats 24 are in constant bearing against the obturation member 10.

Furthermore, the valve 1 comprises an elastic biasing element or a biasing spring, such as for example a spring washer 26, intended to hold the seats 24 in bearing contact against the obturation member 10.

More particularly, the elastic biasing element may be interposed between a shoulder 40 of the duct 4, on which they rest, and the seats 24 on which they exert a substantially axial force, that is to say substantially parallel to the direction in which the duct portion 4 accommodating the obturation member 10 extends.

It will be noted that the valve 1 is advantageously a valve of the plug valve type. The obturation member 10 may have a conical, or cylindrical, or preferably spherical shape as illustrated in the figures. Thus, the valve 1 is advantageously a spherical plug valve, the obturation member 10 is a sphere. Consequently, the contacts of the seats 24 and the obturation member 10 are advantageously of the sphere-sphere type, which substantially improves the sealing, particularly when the seats 24 are flexible.

The plug or obturation member 10 may have a duct 112 opening into two openings. This duct 112 is for example substantially rectilinear; the two openings are preferably diametrically opposed. In the closing position, the openings open on a wall of the duct 4; the duct 112 is for example substantially orthogonal to the duct 4. In the opening position, the openings of the closing member 10 open inside the duct 4, which allows the uranium hexafluoride to circulate through the duct 112 and thus move from the connector portion 6 to the outlet portion 8; the duct 112 is for example substantially parallel to the duct 4. Thus, the valve 1 is of the quarter-turn type, that is to say that a rotation of the obturation member 10 of a quarter turn is necessary to move from the opening position to the closing position or vice versa.

It will be noted that the duct 4 has a bent portion 42, and this bent portion 42 is arranged between the connector portion 6 and the obturation member 10. Thus, the obturation member 10 is offset relative to the direction in which the duct portion 4 delimited by the connector portion 6 extends. The opening of the duct 4 delimited by the connector portion 6 and the obturation member 10 are not facing each other. This protects the obturation member 10 and the seats 24 from uranium hexafluoride crystals which might be projected during an impact, these crystals abut instead on the inner wall 420 of the bent portion 42.

Preferably, the bent portion 42 forms an angle comprised between 90° and 115°, for example in the range of 105°, that is to say the duct portion 4 delimited by the connector portion 6 and the duct portion 4 accommodating the obturation member 10 forms an angle comprised between 90° and 115°, for example in the range of 105°. This allows effectively protecting the obturation member and the seats 24 from the possible projection of the uranium hexafluoride crystals while providing an ease of connection of a duct to the outlet portion 8.

It will be noted that the elastic biasing element may advantageously be positioned between the bent portion 42 and the obturation member 10.

Advantageously, the valve 1 comprises a double sealing arrangement. The double sealing arrangement is configured to form a double sealing barrier at the sensitive areas, namely, where appropriate between the clamping member 22 and the connector portion 6, between the obturation member 10 and the valve body 2, between the control member 14 and the valve body 2, between the outlet portion 8 and the valve body 2, and between the outlet portion 8 and the cap 86.

Thus, the double sealing arrangement comprises a first set of sealing members 24, 28a, 33a, 31, 88, forming a first sealing barrier at the sensitive areas, and a second set of sealing members 30a, 30b, 33b, 32, 34, 28b and 28c, forming a second sealing barrier. The second sealing barrier doubles the first sealing barrier, and succeeds it. This second sealing barrier is therefore arranged at the same sensitive areas as the first barrier.

The first set of sealing members comprises the seats 24 interposed between the obturation member 10 and the valve body 2, a seal 28a arranged between the clamping member 22 and the connector portion 6, a sealing gasket 33a interposed between the control member 14 and the valve body 2, in particular between the control member 14 and an inner wall of the housing 12, a seal 31 interposed between the outlet portion 8 and the valve body 2, and a disc-shaped cap seal 88 interposed between the cap 86 and the outlet portion 8 and obturating the outlet orifice 84.

The second set of sealing members comprises two seals 30a, 30b each interposed between one of the seats 24 and the valve body 2, in particular in a concave portion or shoulder of the seats 24, two seals 28b 28c arranged respectively between the clamping member 22 and the connector portion 6 and between the clamping member 22 and the reservoir 100, a pair of seals 33b interposed between the control member 14 and the valve body 2, in particular between the control member 14 and an inner wall of the housing 12, a seal 32 interposed between the outlet portion 8 and the valve body 2, more precisely between the clamping stop 82 and the valve body 2, and a seal 34 interposed between the cap 86 and the outlet portion 8, about the cap seal 88.

At the connector portion 6, the clamping member 22 and the tank 100, the seal 28a of the first barrier ensures both an axial sealing, with the seal 28b of the second barrier, and a radial sealing, with the seal 28c of the second barrier. The first seal 28a is intended to bear against both the connector portion 6 and against the tank 100, the second seal 28b bears against the connector portion 6, and the third seal 28c is intended to bear against the tank 100.

The first seal 28a is advantageously located at an intersection of an inner wall of the clamping member 22 and the clamping surface 220, for example fastened to a chamfer of the clamping member 22. The second seal 28b is for example housed in a groove formed in the inner wall of the clamping member 22. The third seal 28c is for example housed in a groove arranged in the clamping surface 220.

Preferably, the sealing members forming the first sealing barrier are made of polytetrafluoroethylene (PTFE), while the sealing members forming the second sealing barrier are made of elastomeric material.

Figure 5:
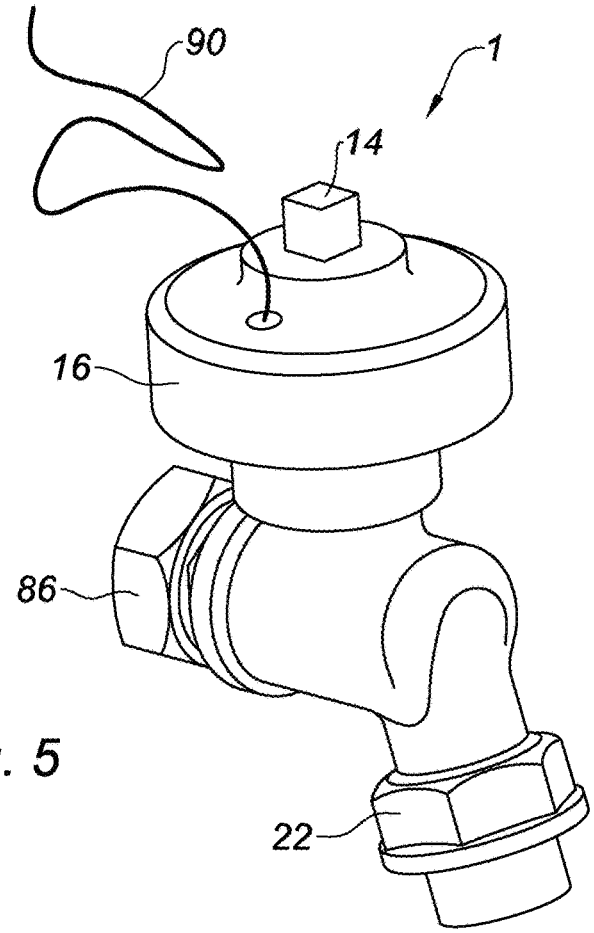
FIG. 5 is a perspective view of a valve according to an embodiment of the invention.

As illustrated in FIG. 5, the valve 1 may advantageously comprise a temperature sensor for measuring the temperature of the duct 4, in order to monitor and prevent the formation of uranium hexafluoride crystals. The temperature sensor may comprise for example a temperature probe 90 and is located in an additional casing.

Of course, the invention is in no way limited to the embodiment described above, this embodiment having been given only by way of example. Modifications are possible, in particular from the point of view of the constitution of the various elements or by the substitution of technical equivalents, however without departing from the scope of protection of the invention.

The invention claimed is:

1. A valve for a uranium hexafluoride storage tank, comprising a valve body, the valve body delimiting a duct and having an inlet connector portion where an end of the duct opens, the inlet connector portion being intended to be connected to the uranium hexafluoride storage tank, and an outlet portion opposite the inlet connector portion, wherein the valve comprises:
    a fastener movably mounted on the inlet connector portion, the fastener removably securing the inlet connector portion to the uranium hexafluoride storage tank,
    an obturation member movable in rotation in the duct between a closing position in which the obturation member obturates the duct and an opening position in which the obturation member releases a passage through the duct,
    two seats interposed between the obturation member and the valve body, and
    a biasing spring providing a biasing force to hold the seats and the obturation member in bearing contact, and wherein
    the duct has a bent portion, the bent portion being arranged upstream the obturation member, between the inlet connector portion and the obturation member, wherein the fastener comprises a first seal configured to bear against both the inlet connector portion and against the uranium hexafluoride storage tank, a second seal bearing against the inlet connector portion, and a third seal configured to bear against the uranium hexafluoride storage tank.

2. The valve according to claim 1, wherein the seats comprise a flexible material.

3. The valve according to claim 1, wherein the valve comprises a double sealing arrangement.

4. The valve according to claim 3, wherein the double sealing arrangement comprises at least a first sealing barrier made of a first material, and a second sealing barrier made of a second material distinct from the first material.

5. The valve according to claim 1, wherein the valve comprises a control member intended to be actuated by a user in order to control the opening or the closing of the valve, and a reducer linking the control member and the obturation member.

6. The valve according to claim 1, wherein the valve comprises a control member intended to be actuated by a user in order to control the opening or the closing of the valve, the control member being fully contained in the valve body or a reducer.

7. The valve according to claim 1, wherein the valve comprises a temperature sensor for measuring the temperature of the duct.

8. The valve according to claim 2, wherein the valve comprises a double sealing arrangement.

9. The valve according to claim 8, wherein the double sealing arrangement comprises at least a first sealing barrier made of a first material, and a second sealing barrier made of a second material distinct from the first material.

10. The valve according to claim 9, wherein the valve comprises a control member intended to be actuated by a user in order to control the opening or the closing of the valve, and a reducer linking the control member and the obturation member.

11. The valve according to claim 10, wherein the control member is fully contained in the valve body or the reducer.

12. The valve according to claim 11, wherein the valve comprises a temperature sensor for measuring the temperature of the duct.

13. The valve according to claim 2, wherein the valve comprises a control member intended to be actuated by a user in order to control the opening or the closing of the valve, and a reducer linking the control member and the obturation member.

14. The valve according to claim 3, wherein the valve comprises a control member intended to be actuated by a user in order to control the opening or the closing of the valve, and a reducer linking the control member and the obturation member.

15. The valve according to claim 4, wherein the valve comprises a control member intended to be actuated by a user in order to control the opening or the closing of the valve, and a reducer linking the control member and the obturation member.

16. The valve according to claim 2, wherein the valve comprises a control member intended to be actuated by a user in order to control the opening or the closing of the valve, the control member being fully contained in the valve body or a reducer.

17. The valve according to claim 3, wherein the valve comprises a control member intended to be actuated by a user in order to control the opening or the closing of the valve, the control member being fully contained in the valve body or a reducer.

18. The valve according to claim 4, wherein the valve comprises a control member intended to be actuated by a user in order to control the opening or the closing of the valve, the control member being fully contained in the valve body or a reducer.

19. The valve according to claim 5, wherein the control member is fully contained in the valve body or the reducer.

20. The valve according to claim 2, wherein the valve comprises a temperature sensor for measuring the temperature of the duct.

21. The valve according to claim 1, wherein the inlet connector portion comprises a first outer thread, the first outer thread being configured to cooperate with a complementary thread formed inside an opening of the uranium hexafluoride storage tank.

22. The valve according to claim 1, wherein the fastener comprises an inner thread, the inner thread engaging an outer thread of the inlet connector portion.

23. The valve according to claim 1, wherein the valve comprises two seals each interposed between one of the seats and the valve body.

24. The valve according to claim 1, wherein the biasing spring is interposed between a shoulder of the duct and the seats.

25. A valve for a uranium hexafluoride storage tank, comprising a valve body, the valve body delimiting a duct and having an inlet connector portion where an end of the duct opens, the inlet connector portion being intended to be connected to the uranium hexafluoride storage tank, and an outlet portion opposite the inlet connector portion, wherein the valve comprises:
   a fastener movably mounted on the inlet connector portion, the fastener removably securing the inlet connector portion to the uranium hexafluoride storage tank,
   an obturation member movable in rotation in the duct between a closing position in which the obturation member obturates the duct and an opening position in which the obturation member releases a passage through the duct,
   two seats interposed between the obturation member and the valve body, and
   a biasing spring providing a biasing force to hold the seats and the obturation member in bearing contact, and wherein
   the duct has a bent portion, the bent portion being arranged upstream the obturation member, between the inlet connector portion and the obturation member, wherein the fastener comprises an inner thread, the inner thread engaging an outer thread of the inlet connector portion.

26. A valve for a uranium hexafluoride storage tank, comprising a valve body, the valve body delimiting a duct and having an inlet connector portion where an end of the duct opens, the inlet connector portion being intended to be connected to the uranium hexafluoride storage tank, and an outlet portion opposite the inlet connector portion, wherein the valve comprises:
   a fastener, the fastener removably securing the inlet connector portion to the uranium hexafluroide storage tank,
   an obturation member movable in rotation in the duct between a closing position in which the obturation member obturates the duct and an opening position in which the obturation member releases a passage through the duct,
   two seats interposed between the obturation member and the valve body, and
   a biasing spring providing a biasing force to hold the seats and the obturation member in bearing contact, and wherein
   the duct has a bent portion, the bent portion being arranged upstream the obturation member, between the inlet connector portion and the obturation member, wherein the inlet connector portion comprises a first outer thread, the first outer thread being configured to cooperate with a complementary thread formed inside an opening of the uranium hexafluoride storage tank.

* * * * *